Patented Sept. 29, 1931

1,825,151

UNITED STATES PATENT OFFICE

SOUREN KEOLEIAN, OF PHILADELPHIA, PENNSYLVANIA, ASSIGNOR OF TWENTY-FIVE PER CENT TO HAIG Y. YARDUMIAN, OF PHILADELPHIA, PENNSYLVANIA

MELTING COMPOUND

No Drawing.    Application filed July 7, 1930.    Serial No. 466,345.

This invention relates to a compound for melting ice and snow and also for preventing the formation of ice.

The object of the invention is to provide a compound which will effectually melt ice when the surrounding atmospheric temperature is at or below zero, and one in which the compound will continue its melting action until ice such as gathers on pavements, walks, railway tracks, manholes in sewers, etc., has all been disintegrated.

A further object of the invention is to provide a compound which, when it has effected its work, will leave no unsightly deposits which are hard to remove.

Still another object of the invention is to provide a compound which will have admixed therewith an abrasive substance which will prevent slipping of pedestrians during the melting operation.

Salt is commonly used for melting ice on pavements, etc., but there are many objections to its use, among these being that it only melts a certain portion of the ice when it loses its effectiveness, and during very cold weather, this melted ice will re-freeze; and when salt is used it leaves white deposits or stains upon pavements and the like, which are very hard to remove, and which present a very unsightly appearance.

In the present invention certain ingredients have been mixed with sodium chloride so as to overcome the objections above stated.

It has been found that if sodium chloride is mixed with ammonium chloride and Epsom salt, that ice will be disintegrated and melted, even in very low temperatures of surrounding atmosphere, and it has been found that by combining with this mixture a certain amount of silica sand and water it can be kept in granular form while the sand will prevent slipping on an icy surface during the melting and disintegration of the ice.

The compound is prepared in the following manner: Sodium chloride and ammonium chloride are mixed with Epsom salt. To this mixture silica sand is added, with just sufficient water to cause a combination of the sodium chloride, ammonium chloride and Epsom salt, while the silica sand will prevent the first named ingredients from congealing and will keep the same in granular form.

The Epsom salt will form a bonding material between the sodium chloride and ammonium chloride and experiment has proven that with these three ingredients in combination, a very desirable melting compound is produced, which is effective even when the surrounding atmosphere is at very low temperature.

It has been found that a suitable compound is obtained by mixing the ingredients in the following proportions:

|  | Per cent |
|---|---|
| Sodium chloride (common lake salt) | 16 |
| Ammonium chloride | 32 |
| Magnesium sulphate (Epsom salt) | 16 |
| Silica sand | 32 |
| Water | 4 |

By increasing the water slightly, the compound may be practically used for coating the wings and fuselage of airplanes, ship ropes and hausers and the like, so as to prevent the formation of ice or snow thereon.

If a small amount of this compound is scattered over a pavement during a snow storm, it will prevent the snow from forming thereon by melting the flakes as rapidly as they come in contact therewith.

Many other uses for the compound will be found, and its proportions may be varied without departing from the invention herein set forth and hereafter claimed.

I claim:—

1. An ice melting compound consisting of sodium chloride, ammonium chloride and magnesium sulphate.

2. An ice melting compound consisting of sodium chloride, ammonium chloride, magnesium sulphate, silica sand, and water.

3. An ice melting compound consisting of the following ingredients in approximately the following proportions: sodium chloride, 25%; ammonium chloride, 50%; and magnesium sulphate, 25%.

4. An ice melting compound consisting of the following ingredients in approximately the following proportions: sodium chloride, 16%; ammonium chloride, 32%; magnesium sulphate, 16%; silica sand, 32%; and water, 4%.

In testimony whereof I have signed my name to this specification.

SOUREN KEOLEIAN.